United States Patent [19]

Siddall et al.

[11] 3,723,462
[45] Mar. 27, 1973

[54] EPITHIO DIENOATES

[75] Inventors: John B. Siddall; Clive A. Henrick, both of Palo Alto, Calif.

[73] Assignee: Zoecon Corporation, Palo Alto, Calif.

[22] Filed: Feb. 1, 1971

[21] Appl. No.: 111,674

[52] U.S. Cl. .......260/327 E, 260/240 H, 260/348 A, 424/248, 424/250, 424/268, 424/274, 424/275, 424/DIG. 12
[51] Int. Cl. ..............................................C07d 59/00
[58] Field of Search ......................260/327 E, 240 H

[56] References Cited

UNITED STATES PATENTS

| 2,729,634 | 1/1956 | Dearborn | 260/239.5 |
| 2,845,438 | 7/1958 | Dearborn | 260/327 |

Primary Examiner—Henry R. Jiles
Assistant Examiner—Cecilia M. S. Jaisle
Attorney—Donald W. Erickson

[57] ABSTRACT

Novel epithio substituted hydro-carbon esters, derivatives thereof, and amides having diunsaturation, synthesis thereof, useful for the control of insects.

14 Claims, No Drawings

EPITHIO DIENOATES

This invention relates to novel unsaturated aliphatic hydrocarbon esters, amides and derivatives thereof useful for the control of insects of the following formula A:

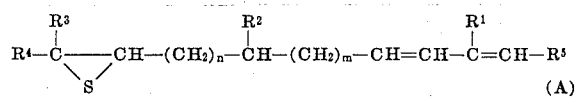
(A)

wherein,

R¹ is hydrogen or alkyl;
each of R², R³ and R⁴ is alkyl;
m is zero or the positive integer one, two or three;
n is the positive integer one, two or three; and
R⁵ is one of the groups:

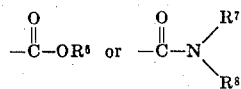

in which R⁶ is hydrogen, alkyl, cycloalkyl, aralkyl or metal cation; and each of R⁷ and R⁸ is hydrogen, alkyl, cycloalkyl, aralkyl, phenyl, alkenyl, hydroxyalkyl, alkoxyalkyl or, when taken together with the nitrogen atom to which they are attached, pyrrolidino, morpholino, piperidino, piperazino or 4-alkyl-piperazino.

The compounds of formula A are useful for the control of insects. The compounds are applied using either liquid or solid carriers, such as water, acetone, cottonseed oil, xylene, mineral oil, silicon, talc, natural and synthetic resins, and the like. Generally, compositions for application will contain up to about 75 percent of the active compound and more usually less than 25 percent, sufficient composition should be applied to provide from about 0.1 to 25 micrograms of the active compound per insect. Typical insects controlled by the present invention are Diptera, such as mosquitos and houseflies; Hemiptera, such as Pyrrho-coridae and Miridae; and Coleoptera, such as Tenebrionidae, Crysomelidae and Dermestidae. For example, Pyrrhocoris apterus, Lygus hesperus, Tenebrio molitor, Triboleum confusm, Diabrotica duodecimpunctata, Dermestes maculatus, Aedes aegypti and Musca domestica. Without any intention of being bound by theory, the compounds of formula A are believed to be effective by reason of hormonal action in that unlike conventional insecticides which are effective by reason of causing immediate death, the compounds of formula A are effective by reason of physiological changes caused in the treated insect which result in eventual death of the insect and/or inability of the treated insect to reproduce by reason of sterility or abnormal development.

In the description hereinafter, each of R¹ through R⁸, m and n is as defined hereinabove.

The compounds of formula A can be prepared according to the following outlined process.

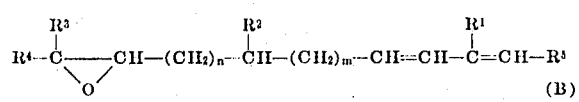
(B)

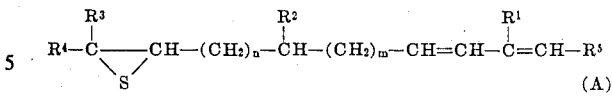
(A)

In the practice of the above process, an epoxide of formula B is reacted with potassium thiocyanate or ammonium thiocyanate in an organic solvent, such as lower alcohol, e.g. ethanol, to yield an episulfide of formula A. The reaction is usually done above room temperature to reflux temperature of the reaction mixture.

The compounds of formula B are prepared as described in our copending applications Ser. Nos. 111,766, now abandoned, and 111,769, filed on even-date,, the disclosures of which are hereby incorporated by reference.

The term "cycloalkyl", as used herein, refers to a cyclic alkyl group of four to eight carbon atoms. The term "aralkyl" refers to a monovalent group in which an aryl group is substituted for a hydrogen atom of an alkyl group, such as benzyl, xylyl, mesityl, phenylethyl, methylbenzyl, naphthylmethyl and naphthylethyl.

The term "alkyl", as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. The term "hydroxyalkyl", as used herein, refers to an alkyl group substituted with one hydroxy group, e.g. hydroxymethyl, p-hydroxyethyl and 4-hydroxypentyl. The term "alkoxyalkyl", as used herein, refers to an alkyl group substituted with one alkoxy group, e.g. methoxymethyl, 2-methoxyethyl, 4-ethoxybutyl, n-propoxyethyl and t-butylethyl. The term "alkenyl", as used herein, refers to an ethylenically unsaturated hydrocarbon group, branched or straight chain, having a chain length of two to twelve carbon atoms, e.g. allyl, vinyl, 3-butenyl, 2-butenyl, 2-hexenyl and i-propenyl. Whenever any of the foregoing terms are modified by the word "lower", the chain length of the group is not more than six carbon atoms with the exception of lower alkoxyalkyl in which event a total chain length of 12 carbon atoms is the maximum.

The following examples are provided to illustrate the practice of the present invention. Temperature is given in degrees Centigrade.

EXAMPLE 1

To 0.60 g. of ethyl 10,11-oxido-3,7,11-trimethyl-dodeca-2,4-dienoate in 25 ml. of absolute ethanol is added 5 ml. of water and 1.0 g. of potassium thiocyanate. The mixture is heated at reflux for about 65 hours. Refluxing is stopped and the mixture poured into brine and extracted with ether. The ethereal extract is washed with brine, dried and evaporated to yield ethyl 10,11-epithio-3,7,11-trimethyldodeca-2,4-dienoate which can be purified by thin layer chromatography or distillation under vacuum.

The above process is repeated using each of the unsaturated esters under Column I to prepare the respective compound under Column II.

I ethyl 10,11-oxido-3,7,11-trimethyltrideca-2,4-dienoate, ethyl 10,11-oxido-3,11-dimethyl-7-ethyltrideca-2,4-dienoate,
ethyl 10,11-oxido-7,11-diethyl-3-methyltrideca-2,4-dienoate,
ethyl 11,12-oxido-3,8,12-trimethyltrideca-2,4-dienoate,
ethyl 9,10-oxido-3,7,10-trimethylundeca-2,4-dienoate,
ethyl 9,10-oxido-3,7,10-trimethyldodeca-2,4-dienoate,
ethyl 9,10-oxido-3,6,10-trimethylundeca-2,4-dienoate,
ethyl 10,11-oxido-7,11-dimethyltrideca-2,4-dienoate,
ethyl 10,11-oxido-11-methyl-7-ethyltrideca-2,4-dienoate,
ethyl 10,11-oxido-7,11-diethyltrideca-2,4-dienoate,
ethyl 11,12-oxido-8,12-dimethyltrideca-2,4-dienoate,
ethyl 9,10-oxido-7,10-dimethylundeca-2,4-dienoate,
ethyl 9,10-oxido-7,10-dimethyldodeca-2,4dienoate, and
ethyl 9,10-oxido-6,10-dimethylundeca-2,4-dienoate.

II ethyl 10,11-epithio-3,7,11-trimethyltrideca-2,4-dienoate,
ethyl 10,11-epithio-3,11-dimethyl-7-ethyltrideca-2,4-dienoate,
ethyl 10,11-epithio-7,11-diethyl-3-methyltrideca-2,4-dienoate,
ethyl 11,12-epithio-3,8,12-trimethyltrideca-2,4-dienoate,
ethyl 9,10-epithio-3,7,10-trimethylundeca-2,4-dienoate,
ethyl 9,10-epithio-3,7,10-trimethyldodeca-2,4-dienoate,
ethyl 9,10-epithio-3,6,10-trimethylundeca-2,4-dienoate,
ethyl 10,11-epithio-7,11-dimethyltrideca-2,4-dienoate,
ethyl 10,11-epithio-11-methyl-7-ethyltrideca-2,4-dienoate,
ethyl 10,11-epithio-7,11-diethyltrideca-2,4-dienoate,
ethyl 11,12-epithio-8,12-dimethyltrideca-2,4-dienoate,
ethyl 9,10-epithio-7,10-dimethylundeca-2,4-dienoate,
ethyl 9,10-epithio-7,10-dimethyldodeca-2,4-dienoate, and
ethyl 9,10-epithio-6,10-dimethylundeca-2,4-dienoate.

EXAMPLE 2

The process of Example 1 is repeated with the exception of using each of the amides under Column III as the starting material to prepare the respective compound under Column IV.

III

N,N-diethyl 10,11-oxido-3,7,11-trimethyldodeca-2,4-dienamide,
N,N-diethyl 10,11-oxido-3,7,11-trimethyltrideca-2,4-dienamide,
N,N-diethyl 10,11-oxido-3,11-dimethyl-7-ethyltrideca-2,4-dienamide,
N,N-diethyl 10,11-oxido-3-methyl-7,11-diethyltrideca-2,4-dienamide,
N,N-diethyl 11,12-oxido-3,8,12-trimethyltrideca-2,4-dienamide,
N,N-diethyl 9,10-oxido-3,7,10-trimethylundeca-2,4-dienamide,
N,N-diethyl 9,10-oxido-3,7,10-trimethyldodeca-2,4-dienamide,
N,N-diethyl 9,10-oxido-3,6,10-trimethylundeca-2,4-dienamide,
N,N-diethyl 10,11-oxido-7,11-dimethyldodeca-2,4-dienamide,
N,N-diethyl 10,11-oxido-7,11-dimethyltrideca-2,4-dienamide,
N,N-diethyl 10,11-oxido-7-ethyl-11-methyltrideca-2,4-dienamide,
N,N-diethyl 10,11-oxido-7,11-diethyltrideca-2,4-dienamide,
N,N-diethyl 11,12-oxido-8,12-dimethyltrideca-2,4-dienamide,
N,N-diethyl 9,10-oxido-7,10-dimethylundeca-2,4-dienamide,
N,N-diethyl 9,10-oxido-7,10-dimethyldodeca-2,4-dienamide, and
N,N-diethyl 9,10-oxido-6,10-dimethylundeca-2,4-dienamide.

IV

N,N-diethyl 10,11-epithio-3,7,11-trimethyldodeca-2,4-dienamide,
N,N-diethyl 10,11-epithio-3,7,11-trimethyltrideca-2,4-dienamide.
N,N-diethyl 10,11-epithio-3,11-dimethyl-7-ethyltrideca-2,4-dienamide,
N,N-diethyl 10,11-epithio-3-methyl-7,11-diethyltrideca-2,4-dienamide,
N,N-diethyl 11,12-epithio-3,8,12-trimethyltrideca-2,4-dienamide,
N,N-diethyl 9,10-epithio-3,7,10-trimethylundeca-2,4-dienamide,
N,N-diethyl 9,10-epithio-3,7,10-trimethyldodeca-2,4-dienamide,
N,N-diethyl 9,10-epithio-3,6,10-trimethylundeca-2,4-dienamide,
N,N-diethyl 10,11-epithio-7,11-dimethyldodeca-2,4-dienamide,
N,N-diethyl 10,11-epithio-7,11-dimethyltrideca-2,4-dienamide,
N,N-diethyl 10,11-epithio-7-ethyl-11-methyltrideca-2,4-dienamide,
N,N-diethyl 10,11-epithio-7,11-diethyltrideca-2,4-dienamide,
N,N-diethyl 11,12-epithio-8,12-dimethyltrideca-2,4-dienamide,
N,N-diethyl 9,10-epithio-7,10-dimethylundeca-2,4-dienamide,
N,N-diethyl 9,10-epithio-7,10-dimethyldodeca-2,4-dienamide, and
N,N-diethyl 9,10-epithio-6,10-dimethylundeca-2,4-dienamide.

EXAMPLE 3

Each of the esters under Column V is used as the starting material in Example 1 in methanol to prepare the respective compounds under Column VI:

V methyl 10,11-oxido-3,7,11-trimethyltrideca-2,4-dienoate,
methyl 10,11-oxido-3,11-dimethyl-7-ethyltrideca-2,4-dienoate,
methyl 10,11-oxido-3-methyl-7,11-diethyltrideca-2,4-dienoate,
methyl 10,11-oxido-3,8,12-trimethyltrideca-2,4-dienoate,
methyl 11,12-oxido-3,7,10-trimethylundeca-2,4-dienoate,
methyl 9,10-oxido-3,7,10-trimethyldodeca-2,4-dienoate, and
methyl 9,10-oxido-3,6,10-trimethylundeca-2,4-dienoate.

VI methyl 10,11-epithio-3,7,11-trimethyldodeca-2,4-dienoate,
methyl 10,11-epithio-3,7,11-trimethyltrideca-2,4-dienoate,
methyl 10,11-epithio-3,11-dimethyl-7-ethyltrideca-2,4-dienoate,
methyl 10,11-epithio-3-methyl-7,11-diethyltrideca-2,4-dienoate,
methyl 11,12epithio-3,8,12trimethyltrideca-2,4 dienoate,
methyl 9,10-epithio-3,7,10-trimethylundeca-2,4-dienoate,
methyl 9,10-epithio-3,7,10-trimethyldodeca-2,4-dienoate, and
methyl 9,10-epithio-3,6,10-trimethylundeca-2,4-dienoate.

EXAMPLE 4

Each of benzyl 10,11-oxido-3,7,11-trimethyltrideca-2,4-dienoate, isopropyl 10,11-oxido-3,7,11-trimethyldodeca-2,4-dienoate, cyclohexyl 10,11-oxido-3,7,11-trimethyldodeca-2,4-dienoate and n-hexyl 9,10-oxido-trimethylundeca-2,4-dienoate is used as the starting material in the procedure of Example 1 to prepare the respective episulfide, that is - benzyl 10,11-epithio-3,7,11-trimethyltrideca-2,4-dienoate, isopropyl 10,11-epithio-3,7,11-trimethyldodeca-2,4-dienoate, cyclohexyl 10,11-epithio-3,7,11-trimethyldodeca-2,4-dienoate, and n-hexyl 9,10-epithio-3,7,10-trimethylundeca-2,4-dienoate.

EXAMPLE 5

Each of N,N-dimethyl 10,11-oxido-3,7,11-trimethyltrideca-2,4-dienamide, N-methyl 10,11-oxido-3,7,11-trimethyltrideca-2,4-dienamide, N,N-isopropyl 10,11-oxido-3,7,11-trimethyltrideca-2,4-dienamide, and N,N-di-n-butyl 10,11oxido-3,7,11-trimethyldodeca-2,4-dienamide is used as the starting material in the process of Example 1 to prepare the respective compound, that is — N,N-dimethyl 10,11-epithio-3,7,11-trimethyltrideca-2,4-dienamide, N-methyl 10,11-epithio-3,7,11-trimethyltrideca-2,4-dienamide, N,N-isopropyl 10,11-epithio-3,7,11-trimethyltrideca-2,4-dienamide, and N,N-di-n-butyl 10,11-epithio-3,7,11-trimethyldodeca-2,4-dienamide.

EXAMPLE 6

To a mixture of 2 g. of trans ethyl 3,7,11-trimethyldodeca-2,4,10-trienoate in 150 ml. of methylene chloride at 0° is slowly added 1.0 molar equivalent of m-chloroperbenzoic acid in 100 ml. of methylene chloride. The resulting mixture is allowed to stand for 30 minutes at 0° and then washed with 2% aqueous sodium bisulfite solution, with 5 percent aqueous sodium bicarbonate solution and with water, dried over sodium sulfate and evaporated to yield trans ethyl 10,11-oxido-3,7,11-trimethyldodeca-2,4 -dienoate, which is purified by chromatography.

What is claimed is:

1. A compound selected from those of the following formula A:

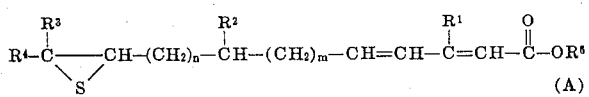

(A)

wherein,
R$^1$ is hydrogen or lower alkyl;
each of R$^2$, R$^3$ and R$^4$ is lower alkyl;
m is zero or the positive integer one, two or three;
n is the positive integer one, two or three; and
R$^6$ is hydrogen, lower alkyl, cycloalkyl of 4 to 8 carbon atoms, or aralkyl of 7 to 12 carbon atoms.

2. A compound according to claim 1 wherein R$^6$ is hydrogen or lower alkyl.

3. A compound according to claim 2 wherein each of R$^2$ and R$^3$ is methyl or ethyl and R$^1$ is hydrogen or methyl.

4. A compound according to claim 3 wherein R$^1$ is methyl.

5. A compound according to claim 4 wherein *m* is one and n is one or two.

6. A compound according to claim 5 wherein *n* is tWo; R$^2$ is methyl or ethyl; R$^3$ is methyl and R$^4$ is methyl or ethyl.

7. A compound according to claim 2 wherein R$^6$ is hydrogen, methyl or ethyl; *m* is one; n is two and each of R$^1$, R$^2$, R$^3$ and R$^4$ is methyl.

8. A compound according to claim 3 wherein R$^1$ is hydrogen.

9. A compound according to claim 8 wherein *m* is one and *n* is one or two.

10. A compound according to claim 9 wherein *n* is two; each of R$^2$ and R$^4$ is methyl or ethyl and R$^3$ is methyl.

11. A compound according to claim 10 wherein each of R$^2$ and R$^4$ is methyl and R$^6$ is hydrogen, methyl or ethyl.

12. The compound, ethyl 10,11-epithio-3,7,11-trimethyldodeca-2,4-dienoate, according to claim 1.

13. The compound, methyl 10,11-epithio-3,7,11trimethyldodeca-2,4-dienoate, according to claim 1.

14. The compound, isopropyl 10,11-epithio-3,7,11-trimethyldodeca-2,4-dienoate, according to claim 1.

* * * * *